(12) United States Patent
van der Broeck

(10) Patent No.: US 12,525,897 B2
(45) Date of Patent: Jan. 13, 2026

(54) POWER CONVERTER AND CIRCUIT ARRANGEMENT WITH SUCH A POWER CONVERTER

(71) Applicant: Robert Bosch Gmbh, Stuttgart (DE)

(72) Inventor: Christoph Henrik van der Broeck, Aachen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 170 days.

(21) Appl. No.: 18/404,059

(22) Filed: Jan. 4, 2024

(65) Prior Publication Data

US 2024/0235382 A1  Jul. 11, 2024

(30) Foreign Application Priority Data

Jan. 10, 2023 (DE) ............... 10 2023 200 118.7

(51) Int. Cl.
| | |
|---|---|
| *H02M 7/487* | (2007.01) |
| *H02M 1/42* | (2007.01) |
| *H02M 7/483* | (2007.01) |
| *H02M 7/5387* | (2007.01) |

(52) U.S. Cl.
CPC ....... *H02M 7/487* (2013.01); *H02M 7/53876* (2021.05); *H02M 1/4216* (2013.01); *H02M 7/4833* (2021.05)

(58) Field of Classification Search
CPC .. H02M 1/4216; H02M 7/4833; H02M 7/487; H02M 7/53876
See application file for complete search history.

(56) References Cited

U.S. PATENT DOCUMENTS

| | | | | |
|---|---|---|---|---|
| 2002/0172058 | A1* | 11/2002 | Szczesny | H02M 7/487 363/40 |
| 2024/0063747 | A1* | 2/2024 | Lu | H02P 27/14 |
| 2024/0079968 | A1* | 3/2024 | Jouzdani | H02M 7/53876 |

FOREIGN PATENT DOCUMENTS

CN  113271028 A  8/2021

OTHER PUBLICATIONS

Doan and Nguyen: "Improved Model Predictive Control for Asymmetric T-Type NPC 3-Level Inverter," Electronics 10, (2021), pp. 1-19, https://doi.org/10.3390/electronics10182244.

* cited by examiner

*Primary Examiner* — Jue Zhang
(74) *Attorney, Agent, or Firm* — NORTON ROSE FULBRIGHT US LLP

(57) ABSTRACT

A power converter and a circuit arrangement. The power converter has a series circuit, including first and second intermediate circuit capacitors, connected in parallel to first and second half-bridges. A first terminal of a first center switch is connected to a center point of the first half-bridge and is configured to provide a first phase. A first terminal of a second center switch is connected to a center point of the second half-bridge of the power converter and is configured to provide a second phase. A second terminal of the first center switch and of the second center switch are connected and configured to provide a third phase. An evaluation unit is configured to actuate the first and second half-bridges, the first center switch, and the second center switch based on a space vector modulation and to adjust a voltage ratio between the first and second intermediate circuit capacitors.

10 Claims, 2 Drawing Sheets

POWER CONVERTER AND CIRCUIT ARRANGEMENT WITH SUCH A POWER CONVERTER

FIELD

The present invention relates to a power converter and to a circuit arrangement with such a power converter.

BACKGROUND INFORMATION

Power converters in different forms are described in the related art, wherein these power converters are, for example, used to convert DC voltages into three-phase signals in order to be able to operate, for example, a three-phase electric motor on the basis of a DC voltage provided by a battery.

Furthermore, it is conventional to use such power converters to generate output voltages which have three voltage levels (3-level) instead of two voltage levels (2-level) in order to reduce a harmonics proportion in the output signal of the power converter. Such a reduction of harmonics accordingly enables a reduction of losses in, for example, an electric machine operated by the power converter. In addition, the reduction of harmonics allows the use of smaller-dimensioned and thus generally more cost-effective filters for filtering the polyphase alternating voltages generated by the power converter. For this reason, in low-voltage applications (e.g., U<2 kV), 3-level power converters, e.g., 3-level NPCs, 3-level ANPCs or 3-level T-type power converters find their way into many applications.

It is also conventional to operate three-phase energy systems on the basis of a 2-level power converter with low effort using only two half-bridges with a limited output voltage range.

SUMMARY

According to a first aspect of the present invention, a power converter and in particular a 2-phase 3-level T-type power converter is provided, which is, for example, used for active rectification or "power factor correction" (PFC) as an inverter for electrical drive systems or as a grid-forming inverter, without thereby limiting the possible fields of application for the power converter according to the present invention to the above examples. The power converter is, for example, used with voltages of up to 400 V, up to 800 V, up to 3.3 kV, without thereby being limited to the aforementioned voltage ranges.

According to an example embodiment of the present invention, the power converter has a first half-bridge comprising a first high-side semiconductor switch and a first low-side semiconductor switch, a second half-bridge comprising a second high-side semiconductor switch and a second low-side semiconductor switch, a first center switch, a second center switch, a first intermediate circuit capacitor, a second intermediate circuit capacitor, and an evaluation unit.

According to an example embodiment of the present invention, the first center switch and the second center switch are preferably each composed of two semiconductor switches which are interconnected in a so-called "back-to-back" arrangement in order to form a bidirectionally blocking topological switch in each case. Alternatively or additionally, it is possible that the first center switch and/or the second center switch are each designed as an individual, bidirectionally blocking semiconductor switch, as conventional in the related art on the basis of GaN technology or SiC technology, for example.

The evaluation unit is, for example, designed as an ASIC, FPGA, processor, digital signal processor, microcontroller, or the like.

According to an example embodiment of the present invention, a series circuit consisting of the first intermediate circuit capacitor and the second intermediate circuit capacitor is connected in parallel to the first half-bridge and to the second half-bridge and is configured to be supplied with an intermediate circuit voltage (e.g., with a DC voltage).

A first terminal of the first center switch is connected between the first high-side semiconductor switch and the first low-side semiconductor switch and is configured to provide a signal representing a first phase (i.e., a first AC output signal) of the power converter.

A first terminal of the second center switch is connected between the second high-side semiconductor switch and the second low-side semiconductor switch and is configured to provide a signal representing a second phase (i.e., a second AC output signal) of the power converter.

A second terminal of the first center switch and a second terminal of the second center switch are connected and configured to provide a signal representing a third phase (i.e., a third AC output signal) of the power converter.

The evaluation unit is configured to actuate the semiconductor switches of the first half-bridge, the semiconductor switches of the second half-bridge, the first center switch, and the second center switch in accordance with a space vector modulation. For this purpose, the evaluation unit is advantageously informationally connected to respective drivers for the respective semiconductor switches in order to put the semiconductor switches into respective target switching states by respective actuations of their corresponding drivers.

The evaluation unit is furthermore configured to generate the signals for the first phase, the second phase, and the third phase, which are configured to operate a polyphase energy system. The evaluation unit is furthermore configured to adjust a voltage ratio between a voltage present at the first intermediate circuit capacitor (a first intermediate circuit voltage) and a voltage present at the second intermediate circuit capacitor (a second intermediate circuit voltage) as a function of a respective position of the space vector in order to expand a maximum (AC) voltage range of the three phases.

In other words, the first and second intermediate circuit voltages, which remain constant in total, are temporarily raised and lowered by suitable adjustments over a fundamental period of the space vector modulation so that a center potential between the first intermediate circuit capacitor and the second intermediate circuit capacitor is shifted in a suitable manner.

The 2-phase 3-level T-type power converter ("2-phase" stands here for the realization of two phases via a conventional half-bridge configuration, while the third phase is provided via the center voltage) has nine realizable switching states. The nine space vectors corresponding thereto depend on the first and second intermediate circuit voltages. In this case, there are three space vectors that depend only on the first intermediate circuit voltage. Furthermore, there are three complementary space vectors, which depend only on the second intermediate circuit voltage. These six space vectors of the same length form a voltage time surface of a hexagon. In addition, there are two longer space vectors which depend on both intermediate circuit voltages and extend the voltage hexagon into a voltage trapezoid. Finally, there is a zero vector, which is voltage-independent and short-circuits the three phases.

In the case of a conventional use of substantially constant and substantially identical voltages at the first capacitor and at the second capacitor (i.e., using a voltage ratio of 1), on the other hand, only a single fixed voltage trapezoid can be generated by means of the space vector modulation, as a result of which a supply of a three-phase energy system on the basis of a conventional 2-phase 3-level T-type power converter is only possible with a correspondingly limited output voltage range.

In contrast, by the additional shift according to the present invention of the center voltage of the intermediate circuit, the voltage trapezoid can be shifted in such a way that a larger voltage hexagon is spanned as a result of the shift. In the extreme case, the intermediate circuit voltages can be shifted to such an extent that either the first intermediate circuit voltage or the second intermediate circuit voltage becomes zero. The resulting voltage hexagon allows a 3-phase energy system to be operated with a correspondingly expanded voltage range.

According to an example embodiment of the present invention, in order that the power converter can realize this broad voltage range, the voltage ratio between the first intermediate circuit capacitor and the second intermediate circuit capacitor must be inverted twice per electrical fundamental period. In this case, the voltage at the first intermediate circuit capacitor is decreased and the voltage at the second intermediate circuit capacitor is increased between an electrical angle of 120° and 180°, while the voltage at the second intermediate circuit capacitor is decreased and the voltage at the second intermediate circuit capacitor is increased again between an electrical angle of 300° and 360°.

Accordingly, a low-effort and/or cost-effective 3-level power converter can be realized on the basis of only two half-bridges, which power converter is configured to exchange energy with a three-phase energy system in a broad voltage range.

In addition, a reduction in conduction losses can be achieved on the basis of the 2-phase 3-level T-type topology, which is achieved by not needing the third half-bridge. At any point in time, with the exception of the switching operations, only two power components conduct current, while at least three power components conduct current in typical 3-phase 2-level or multi-level power converters. This achieves increased efficiency of the converter and facilitates waste heat dissipation.

Preferred developments of the present invention are disclosed herein.

In an advantageous embodiment of the present invention, the semiconductor switches of the half-bridges and/or the center switches are each designed as a Si-MOSFET and/or as a SiC-MOSFET and/or as a GaN-MOSFET and/or as a GIT (e.g., as a GaN-GIT) and/or as an IGBT (e.g., as a Si-IGBT and/or as a SiC-IGBT) and/or as a HEMT (e.g., as a GaN HEMT). In addition, it is not necessary for the center switches and the semiconductor switches of the respective half-bridges to be designed identically. Since the center switches experience a lower load, it is possible, for example, to dimension them to be smaller in order to thus save costs for the center switches.

In a further advantageous embodiment of the present invention, the evaluation unit is configured to adjust the voltage ratio between the intermediate circuit capacitors in that, from a multitude of equivalent (redundant) space vectors, the space vectors that lead to a desired adjustment of the voltage ratio are respectively used for the space vector modulation. This offers the particular advantage that no further components need to be added to the power converter described above in order to realize the adjustment according to the present invention of the voltage ratio.

Particularly advantageously, the power converter according to an example embodiment of the present invention additionally has a first electrical component, which is connected in parallel to the first intermediate circuit capacitor, and a second electrical component, which is connected in parallel to the second intermediate circuit capacitor, wherein the first component and/or the second component are each in particular a DC/DC converter and/or an actively controlled load and/or a variable voltage source. For example, the first and second electrical components can also be designed as one component configured to balance voltages of the intermediate circuit capacitors. Such a component has, for example, a series circuit consisting of a first and a second balancing switch as the first and second electrical components, which are connected in parallel to the series circuit consisting of the first and the second intermediate circuit capacitor, the center point of which is connected via an inductance to the center point of the series circuit consisting of the first and the second intermediate circuit capacitor. Alternatively or additionally, the first and the second electrical components form a DC/DC converter (e.g., a 3-level converter) with a center tap, which converter is connected in parallel to the first and second intermediate circuit capacitors, the center tap of which is connected to the center point of the series circuit consisting of the first and the second intermediate circuit capacitor. Furthermore, the evaluation unit is configured to actuate the first component and the second component in order to adjust the voltage ratio between the two intermediate circuit capacitors. The use of the first and second electrical components offers the advantage that the two intermediate circuit capacitors can be reversed on the basis thereof over a particularly wide range and/or particularly flexibly.

The evaluation unit is advantageously configured to set a speed for adjusting the voltage ratio between the two intermediate circuit capacitors as a function of a maximum permissible power loss and/or as a function of a maximum permissible proportion of generated harmonics and/or as a function of a voltage range to be provided. This enables a particularly accurate adjustment of the reversal of the intermediate circuit capacitors to respective operating conditions of the power converter according to the present invention.

In a further advantageous embodiment of the present invention, the evaluation unit is configured to take into account an asymmetrical load of the intermediate circuit capacitors when adjusting the voltage ratio between the two intermediate circuit capacitors. In other words, undesired voltage changes at the intermediate circuit capacitors can thereby be counteracted in order to thus ensure particularly stable operation of the power converter according to the present invention.

In a particularly advantageous embodiment of the power converter according to the present invention, the evaluation unit is configured to control the adjustment of the voltage ratio between the two intermediate circuit capacitors based on a voltage measurement across the first intermediate circuit capacitor and/or across the second intermediate circuit capacitor. In a case in which only one of the two voltages is measured, the other voltage in question can, for example, be ascertained by the evaluation unit on the basis of information provided to the evaluation unit about a total voltage drop across the series circuit of the two intermediate circuit capacitors and/or on the basis of a measurement of the total voltage drop. The control of the current target voltages across the two intermediate circuit capacitors, which depend on respective angles of the space vector as described above, takes place, for example, by means of the first electrical component and/or the second electrical component and/or the use of respectively suitable equivalent space vectors.

In a further advantageous embodiment of the present invention, the power converter additionally has a third half-bridge comprising a third high-side semiconductor switch and a third low-side semiconductor switch, and a third center switch, wherein a first terminal of the third center switch is connected between the third high-side semiconductor switch and the third low-side semiconductor switch and is configured to provide, in a fault-free state of the power converter, a signal representing the third phase of the power converter. In addition, a second terminal of the third center switch is connected to the second terminal of the first center switch and to the second terminal of the second center switch. On the basis of this configuration, a 3-phase 3-level T-type topology is accordingly realized, on the basis of which a particularly fault-tolerant operation can be achieved (as explained in more detail below).

Advantageously, according to an example embodiment of the present invention, the power converter with the third half-bridge described above is configured, in the event of an erroneously open state ("open circuit") of one of the semiconductor switches of the respective half-bridges, to perform an operation in that the center switch that corresponds to the faulty half-bridge is closed. In other words, the above-described 2-phase 3-level T-type topology is achieved by closing the center switch. As soon as this state is reached, the evaluation unit is preferably operated as described according to the present invention in order to substantially maintain a broad voltage range of the power converter despite the failure of one of the three half-bridges. In the event of an erroneously open state of one of the center switches, the power converter according to the present invention is configured to continue to be operated in two-level operation. Furthermore, in the event of an erroneously closed state (short circuit) of one of the center switches, the power converter is configured to implicitly perform the operation described herein. Accordingly, such a 3-phase 3-level T-type power converter can also continue to be operated in the case of different faults in that the actuation according to the present invention of the respective semiconductor switches by the evaluation unit takes place, whereby an availability and/or a reliability of a power converter designed in this way can be increased. It is pointed out in general that such faults can occur in any of the three phases and can in each case be compensated for on the basis of the remaining fault-free phases.

According to a second aspect of the present invention, a circuit arrangement is provided which has an electrical energy source and/or an electrical energy sink, a power converter according to the first aspect of the present invention, and a polyphase energy system (electric machine such as a three-phase motor, a power grid, etc.), wherein the electrical energy source and/or the polyphase energy system is configured to provide the power converter with a voltage to be converted, and wherein the power converter is configured to convert a DC voltage provided by the energy source (e.g., a battery) into a polyphase output signal in order to provide the latter to the polyphase electrical energy system, and/or to convert a polyphase signal of the electrical energy system into a DC voltage in order to provide the latter to the energy sink (e.g., a battery and/or a consumer, etc.). In other words, it is thus possible to advantageously operate the power converter according to the present invention in both possible energy flow directions.

BRIEF DESCRIPTION OF THE DRAWINGS

Exemplary embodiments of the present invention are described in detail below with reference to the figures.

DETAILED DESCRIPTION OF EXAMPLE EMBODIMENTS

Figure 1:
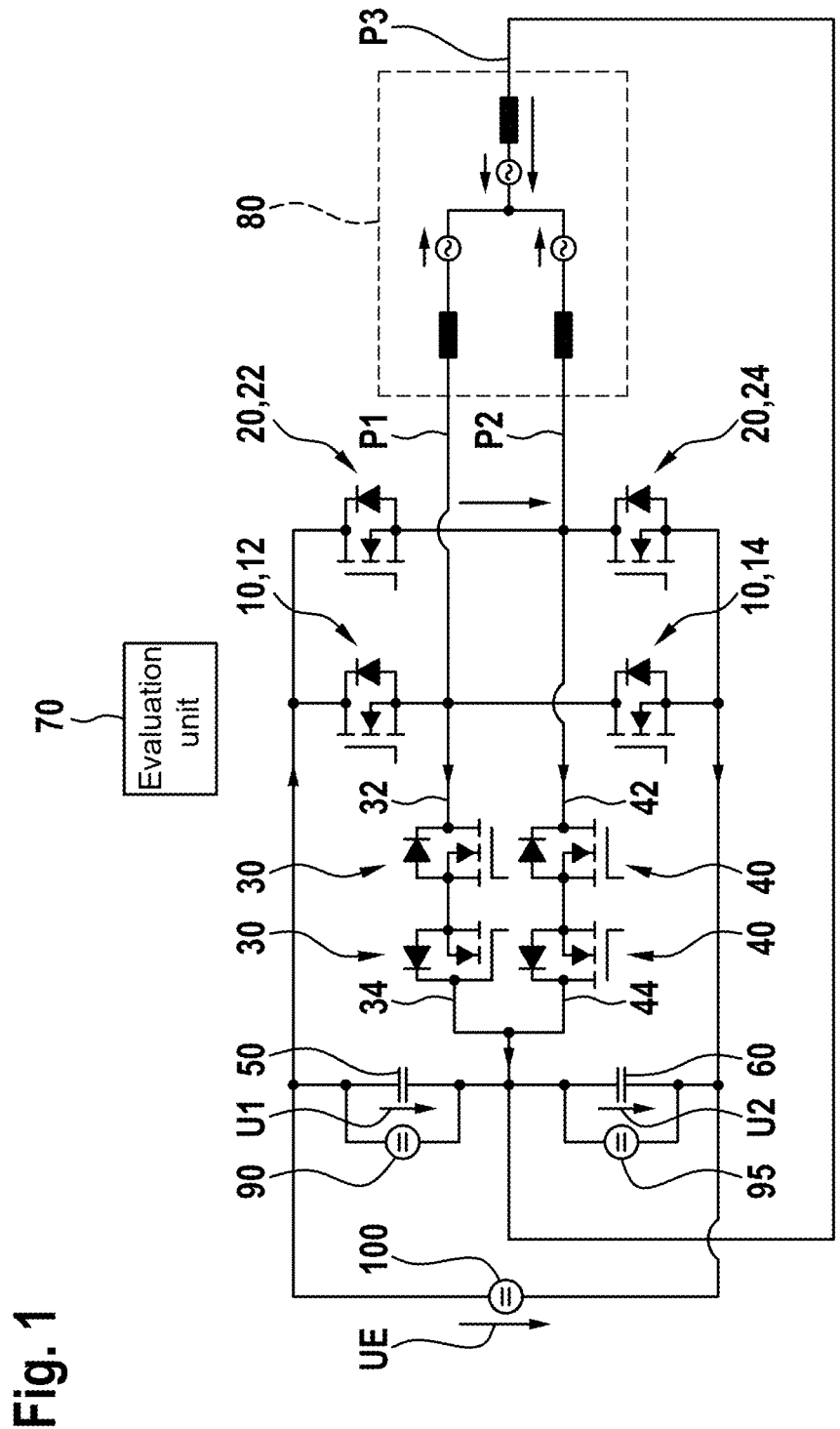
FIG. 1 shows a circuit arrangement with an embodiment of a power converter according to an example embodiment of the present invention.

FIG. 1 shows a circuit arrangement with an embodiment of a power converter according to the present invention, wherein the power converter is here designed, by way of example, as an inverter for a three-phase motor 80.

In addition to the components of the power converter, the circuit arrangement has a battery 100, which is configured to provide the power converter with a DC voltage UE to be converted.

The power converter has a first half-bridge 10 comprising a first high-side semiconductor switch 12 and a first low-side semiconductor switch 14, a second half-bridge 20 comprising a second high-side semiconductor switch 22 and a second low-side semiconductor switch 24, a first center switch 30, a second center switch 40, a first intermediate circuit capacitor 50, a second intermediate circuit capacitor 60, and an evaluation unit 70.

The semiconductor switches 12, 14, 22, 24 and the center switches 30, 40 are designed as SiC-MOSFETs, which are here each shown with their intrinsic body diodes. In order to be able to block bidirectionally, the respective center switches 30, 40 are each composed of two semiconductor switches arranged in anti-series ("back-to-back").

The evaluation unit 70 is here designed, by way of example, as an ASIC and is configured to actuate the respective semiconductor switches 12, 14, 22, 24 and the semiconductor switches of the center switches 30, 40 via respective gate drivers (not shown). It is pointed out that respective electrical connections between the evaluation unit 70 and the semiconductor switches 12, 14, 22, 24 and the center switches 30, 40 are not shown for the sake of clarity.

A series circuit consisting of the first intermediate circuit capacitor 50 and the second intermediate circuit capacitor 60 is connected in parallel to the first half-bridge 10 and to the second half-bridge 20 and is configured to be supplied with the intermediate circuit voltage UE.

A first terminal 32 of the first center switch 30 is connected between the first high-side semiconductor switch 12 and the first low-side semiconductor switch 14 and is configured to provide a signal representing a first phase P1 of the power converter.

A first terminal 42 of the second center switch 40 is connected between the second high-side semiconductor switch 22 and the second low-side semiconductor switch 24 and is configured to provide a signal representing a second phase P2 of the power converter.

A second terminal 34 of the first center switch 30 and a second terminal 44 of the second center switch 40 are connected and configured to provide a signal representing a third phase P3 of the power converter.

The evaluation unit 70 is configured to actuate the semiconductor switches 12, 14 of the first half-bridge 10, the semiconductor switches 22, 24 of the second half-bridge 20, the first center switch 30, and the second center switch 40 in accordance with a space vector modulation, and thereby to generate the signals for the first phase P1, the second phase P2, and the third phase P3, which are configured to operate the three-phase motor 80.

For this purpose, the evaluation unit 70 is furthermore configured to adjust, by actuating a first variable voltage source 90, which is connected in parallel to the first intermediate circuit capacitor 50, and by actuating a second variable voltage source 95, which is connected in parallel to the second intermediate circuit capacitor 50, a voltage ratio between a voltage U1 present at the first intermediate circuit capacitor 50 and a voltage U2 present at the second intermediate circuit capacitor 60 as a function of a respective position of the space vector in order to expand a maximum voltage range of the three phases P1, P2, P3.

Figure 2:
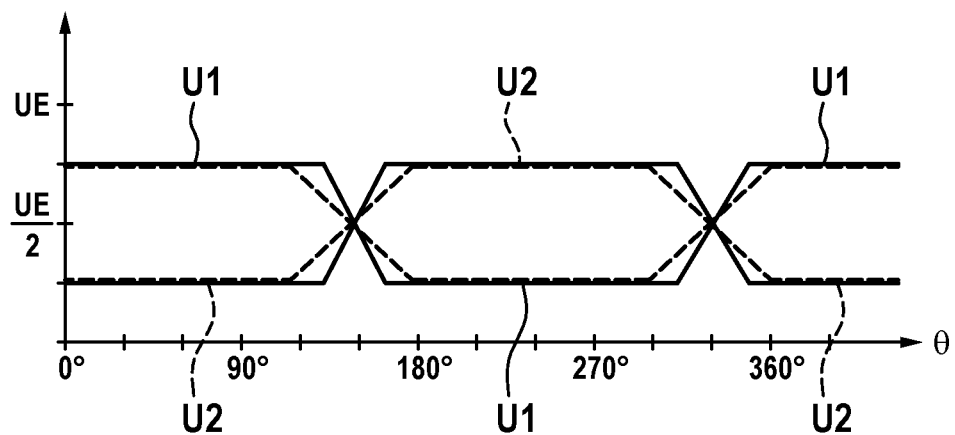
FIG. 2 shows exemplary curves of intermediate circuit voltages according to the present invention, according to an example embodiment of the present invention.

FIG. 2 shows exemplary curves of intermediate circuit voltages U1, U2 according to the present invention, wherein U1 represents the intermediate circuit voltage at the first intermediate circuit capacitor 50 (see FIG. 1) and U2 represents the intermediate circuit voltage at the second intermediate circuit capacitor 60 (see FIG. 1).

It can be seen in FIG. 2 that the respective intermediate circuit voltages U1, U2 are reversed twice within a fundamental period (i.e., between an electrical angle θ of 0° to 360°) in order to achieve the expanded output voltage range according to the present invention of the phases P1, P2, P3.

The transitions between the respective reversed states are shown, by way of example, in each case as solid lines and as dashed lines in order to indicate that different speeds can be used for the reversal in order to, for example, fulfill predefined boundary conditions for the operation of the power converter according to the present invention.

Figure 3:
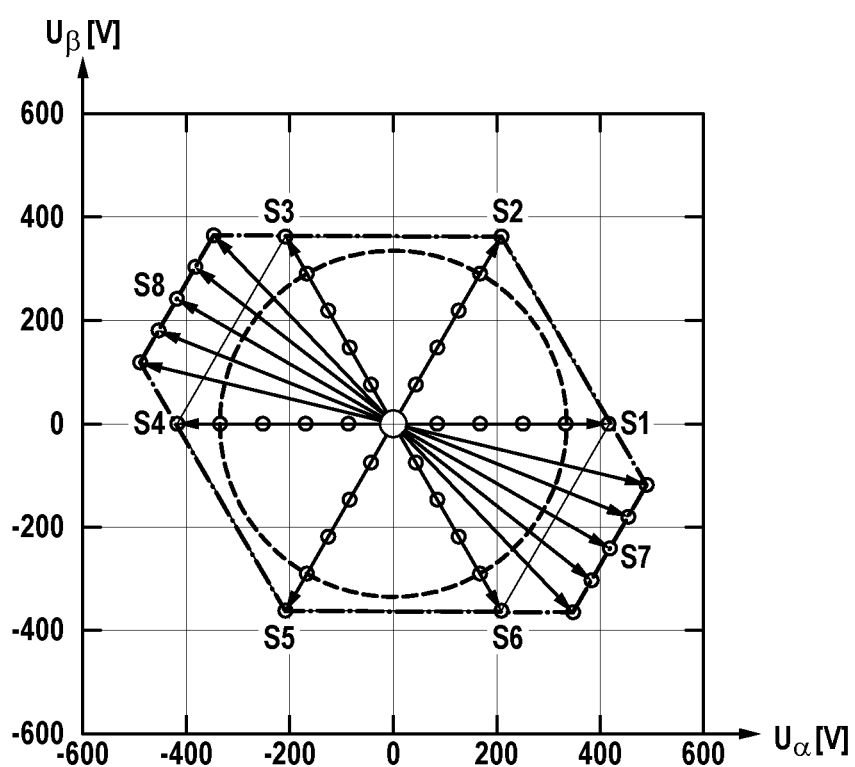
FIG. 3 shows a space vector diagram on which the power converter according to the present invention is based.

FIG. 3 shows a space vector diagram on which the power converter according to the present invention is based.

In the sectors of the hexagon, which is spanned by the space vectors S1, S2, and S3, the power converter can be operated with constant intermediate circuit voltages U1 and U2. In this case, U1>>U2 applies in this range.

For the voltage modulation in these sectors, the space vectors S1, S2, and S3, and the zero vector S9 are primarily used. The remaining space vectors are preferably used in this operating range only if compensation for intermediate circuit asymmetries is required.

The procedure is analogous in the sectors of the hexagon spanned by the space vectors S4, S5, and S6.

In the remaining 2 sectors, which are limited by the space vectors S3 and S4 as well as S6 and S1, such a modulation is not continuously possible. During the voltage transition in the intermediate circuit, the length of the space vector S3 (or S6) is reduced and the space vector S4 (or S1) is increased.

As a result, the hexagon which is spanned by the space vectors S1-S6 is temporarily reduced at U1=U2. In this range, it is therefore necessary to include the space vectors S8 (or S7) for the generation of the 3-phase AC voltage.

Lastly, the operating method described here makes it possible to use the 2-phase 3-level power converter according to the present invention e.g. as a grid-forming converter for the operation of a 3-phase energy system and to achieve the advantages described above.

The invention claimed is:

1. A power converter, comprising:
a first half-bridge including a first high-side semiconductor switch and a first low-side semiconductor switch;
a second half-bridge including a second high-side semiconductor switch and a second low-side semiconductor switch;
a first center switch;
a second center switch;
a first intermediate circuit capacitor;
a second intermediate circuit capacitor; and
an evaluation unit,
wherein
a series circuit including the first intermediate circuit capacitor and the second intermediate circuit capacitor is connected in parallel to the first half-bridge and to the second half-bridge and is configured to be supplied with an intermediate circuit voltage;
a first terminal of the first center switch is connected between the first high-side semiconductor switch and the first low-side semiconductor switch and is configured to provide a signal representing a first phase of the power converter;
a first terminal of the second center switch is connected between the second high-side semiconductor switch and the second low-side semiconductor switch and is configured to provide a signal representing a second phase of the power converter;
a second terminal of the first center switch and a second terminal of the second center switch are connected and configured to provide a signal representing a third phase of the power converter;
the evaluation unit is configured to:
actuate the first high-side and the first low-side semiconductor switches of the first half-bridge, the second high-side and the second low-side semiconductor switches of the second half-bridge, the first center switch, and the second center switch, in accordance with a space vector modulation, to generate the signals for the first phase, the second phase, and the third phase, which are configured to operate a polyphase energy system, and
adjust a voltage ratio between a voltage present at the first intermediate circuit capacitor and a voltage present at the second intermediate circuit capacitor as a function of a respective position of the space vector in order to expand a maximum voltage range of the first, second, and third phases.

2. The power converter according to claim 1, wherein: (i) the first high-side and first low-side semiconductor switches of the first half-bridge and the second high-side and second low-side semiconductor switches of the second half bridge, and/or (ii) the first and second center switches are each:
a power semiconductor switch, and/or
a Si-MOSFET, and/or
a SiC-MOSFET, and/or
a GaN-MOSFET, and/or
a GIT, and/or
an IGBT, and/or
an HEMT.

3. The power converter according to claim 1, wherein the evaluation unit is configured to adjust the voltage ratio between the first and second intermediate circuit capacitors in that, from a multitude of equivalent space vectors, the space vectors that lead to a desired adjustment of the voltage ratio are respectively used for the space vector modulation.

4. The power converter according to claim 1, further comprising:
- a first electrical component, which is connected in parallel to the first intermediate circuit capacitor;
- a second electrical component, which is connected in parallel to the second intermediate circuit capacitor; wherein
  - the first electrical component and/or the second electrical component are each: (i) a DC/DC converter, and/or (ii) an actively controlled load, and/or (iii) a variable voltage source; and
  - the evaluation unit is configured to actuate the first electrical component and the second electrical component in order to adjust the voltage ratio between the first and the second intermediate circuit capacitors.

5. The power converter according to claim 1, wherein the evaluation unit is configured to set a speed for adjusting the voltage ratio between the first intermediate circuit capacitor and the second intermediate circuit as a function of:
- a maximum permissible power loss, and/or
- a maximum permissible proportion of generated harmonics, and/or
- a voltage range to be provided.

6. The power converter according to claim 1, wherein the evaluation unit is configured to take into account an asymmetrical load of the first and second intermediate circuit capacitors when adjusting the voltage ratio between the first and second intermediate circuit capacitors.

7. The power converter according to claim 1, wherein the evaluation unit is configured to control the adjustment of the voltage ratio between the first and second intermediate circuit capacitors based on a voltage measurement across the first intermediate circuit capacitor and/or across the second intermediate circuit capacitor.

8. The power converter according to claim 1, further comprising:
- a third half-bridge including a third high-side semiconductor switch and a third low-side semiconductor switch; and
- a third center switch; wherein:
  - a first terminal of the third center switch is connected between the third high-side semiconductor switch and the third low-side semiconductor switch and is configured to provide, in a fault-free state of the power converter, a signal representing the third phase of the power converter, and
  - a second terminal of the third center switch is connected to the second terminal of the first center switch and to the second terminal of the second center switch.

9. The power converter according to claim 8, wherein the power converter is configured to:
- in the event of an erroneously open state of one of the semiconductor switches of the half-bridges, close the center switch that corresponds to the faulty half-bridge,
- in the event of an erroneously open state of one of the center switches, to continue to be operated in two-level operation, and
- in the event of an erroneously closed state of one of the center switches, to implicitly:
  - actuate the first high-side and the first low-side semiconductor switches of the first half-bridge, the second high-side and the second low-side semiconductor switches of the second half-bridge, the first center switch, and the second center switch, in accordance with a space vector modulation, to generate the signals for the first phase, the second phase, and the third phase, which are configured to operate a polyphase energy system, and
  - adjust the voltage ratio between a voltage present at the first intermediate circuit capacitor and a voltage present at the second intermediate circuit capacitor as a function of a respective position of the space vector in order to expand a maximum voltage range of the first, second, and third phases.

10. A circuit arrangement, comprising:
- an electrical energy source and/or an electrical energy sink;
- a power converter, including:
  - a first half-bridge including a first high-side semiconductor switch and a first low-side semiconductor switch,
  - a second half-bridge including a second high-side semiconductor switch and a second low-side semiconductor switch,
  - a first center switch,
  - a second center switch,
  - a first intermediate circuit capacitor,
  - a second intermediate circuit capacitor; and
  - an evaluation unit, wherein:
    - a series circuit including the first intermediate circuit capacitor and the second intermediate circuit capacitor is connected in parallel to the first half-bridge and to the second half-bridge and is configured to be supplied with an intermediate circuit voltage;
    - a first terminal of the first center switch is connected between the first high-side semiconductor switch and the first low-side semiconductor switch and is configured to provide a signal representing a first phase of the power converter;
    - a first terminal of the second center switch is connected between the second high-side semiconductor switch and the second low-side semiconductor switch and is configured to provide a signal representing a second phase of the power converter;
    - a second terminal of the first center switch and a second terminal of the second center switch are connected and configured to provide a signal representing a third phase of the power converter;
    - the evaluation unit is configured to:
      - actuate the first high-side and the first low-side semiconductor switches of the first half-bridge, the second high-side and the second low-side semiconductor switches of the second half-bridge, the first center switch, and the second center switch, in accordance with a space vector modulation, to generate the signals for the first phase, the second phase, and the third phase, which are configured to operate a polyphase energy system, and
      - adjust a voltage ratio between a voltage present at the first intermediate circuit capacitor and a voltage present at the second intermediate circuit capacitor as a function of a respective position of the space vector in order to expand a maximum voltage range of the first, second, and third phases; and
- a polyphase energy system;

wherein:
 the electrical energy source and/or the polyphase energy system is configured to provide the power converter with a voltage to be converted, and
 the power converter is configured to:
  convert a DC voltage into a polyphase output signal in order to operate the polyphase energy system, and/or
  convert a polyphase signal of the electrical energy system into a DC voltage in order to provide the DC voltage to the energy sink.

* * * * *